United States Patent
Bang

(10) Patent No.: US 8,874,297 B2
(45) Date of Patent: Oct. 28, 2014

(54) METHOD AND SYSTEM FOR CONTROLLING ANTI-JERK OF ELECTRIC VEHICLE

(71) Applicants: Hyundai Motor Company, Seoul (KR); Kia Motors Corporation, Seoul (KR)

(72) Inventor: Jae Sung Bang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 24 days.

(21) Appl. No.: 13/710,166

(22) Filed: Dec. 10, 2012

(65) Prior Publication Data

US 2014/0107877 A1  Apr. 17, 2014

(30) Foreign Application Priority Data

Oct. 17, 2012 (KR) .................. 10-2012-0115635

(51) Int. Cl.
  *B60L 15/20* (2006.01)
  *G05B 11/01* (2006.01)
  *G05B 1/01* (2006.01)

(52) U.S. Cl.
  CPC .................................... *B60L 15/20* (2013.01)
  USPC .............. 701/22; 701/99; 180/65.8; 318/618; 318/632; 318/638; 318/702

(58) Field of Classification Search
  CPC ..... B60W 10/06; B60W 30/20; F02D 41/021; F02D 41/1498; F02D 2250/18
  USPC ......... 701/22, 99; 318/434, 400.42, 702, 567, 318/611, 618, 629, 632, 638; 180/65.1, 180/65.8
  See application file for complete search history.

(56) References Cited

U.S. PATENT DOCUMENTS

| | | | | |
|---|---|---|---|---|
| 5,990,645 A * | 11/1999 | Nakamura et al. | ............. | 318/432 |
| 6,264,292 B1 * | 7/2001 | Umeno et al. | ................ | 303/196 |
| 8,036,394 B1 * | 10/2011 | Yonemoto et al. | ............... | 381/61 |
| 8,478,503 B2 * | 7/2013 | Otsuka | ............................ | 701/99 |
| 2002/0060545 A1 * | 5/2002 | Inagaki et al. | ................ | 318/629 |
| 2005/0253543 A1 * | 11/2005 | Soudier et al. | ................ | 318/432 |
| 2009/0058346 A1 * | 3/2009 | Marushita et al. | ............ | 318/611 |
| 2009/0251096 A1 * | 10/2009 | Schulz et al. | ................. | 318/801 |

(Continued)

FOREIGN PATENT DOCUMENTS

| | | | |
|---|---|---|---|
| JP | 2002171778 A | | 6/2002 |
| JP | 2009273328 A | | 11/2009 |

(Continued)

*Primary Examiner* — Fadey Jabr
*Assistant Examiner* — Courtney Heinle
(74) *Attorney, Agent, or Firm* — Edwards Wildman Palmer LLP; Peter F. Corless

(57) ABSTRACT

Disclosed are a method and system of controlling anti-jerk for reducing vibration of an electric vehicle using power of a motor. The method includes outputting an actual speed of the motor; outputting a model speed of the motor; obtaining a vibration component based on a deviation between the output motor speed and actual speed of the motor; high pass filtering the vibration component to remove an error component in the vibration component; delaying a phase of the filtered vibration component for a preset time to compensate for phase error occurring during the high pass filtering; and applying a preset gain to the vibration component in which the phase is delayed for the preset time to generate an anti-jerk compensation torque based on the applying of the preset gain.

17 Claims, 8 Drawing Sheets

(56) References Cited

U.S. PATENT DOCUMENTS

| | | | |
|---|---|---|---|
| 2010/0228465 A1* | 9/2010 | Itabashi | 701/104 |
| 2011/0077835 A1* | 3/2011 | Otsuka | 701/99 |
| 2011/0112709 A1* | 5/2011 | Park et al. | 701/22 |
| 2011/0137514 A1* | 6/2011 | Itabashi | 701/29 |
| 2011/0266760 A1* | 11/2011 | Itabashi | 280/5.507 |
| 2012/0179332 A1* | 7/2012 | Harima | 701/37 |
| 2012/0265400 A1* | 10/2012 | Oikawa | 701/37 |
| 2013/0325289 A1* | 12/2013 | Ikeda et al. | 701/101 |
| 2014/0046558 A1* | 2/2014 | Kim | 701/54 |

FOREIGN PATENT DOCUMENTS

| | | |
|---|---|---|
| KR | 10-1999-0037701 | 5/1999 |
| KR | 10-2002-0052322 | 7/2002 |
| KR | 10-2011-0049934 | 5/2011 |

* cited by examiner

METHOD AND SYSTEM FOR CONTROLLING ANTI-JERK OF ELECTRIC VEHICLE

CROSS-REFERENCE TO RELATED APPLICATION

This application claims priority to and the benefit of Korean Patent Application No. 10-2012-0115635 filed in the Korean Intellectual Property Office on Oct. 17, 2012, the entire contents of which are incorporated herein by reference.

BACKGROUND OF THE INVENTION (a) Field of the Invention

The present invention relates to a system and a method of controlling anti-jerk for reducing vibration of an electric vehicle using power of a motor.

(b) Description of the Related Art

As generally known in the art, an electric vehicle is a vehicle which runs using power of a battery, and a hybrid electric vehicle simultaneously uses power of a conventional internal combustion engine and power of a battery. The pure electric vehicle runs by only power of a motor operating by power of a battery. The hybrid electric vehicle runs by efficiently combining power of the internal combustion engine and power of the motor.

For example, as shown in FIG. 1, the hybrid electric vehicle may include an engine 10; a motor 20; an engine clutch 30 controls power between the engine 10 and the motor 20; a transmission 40; a differential gear unit 50; a battery 60; a starting/power generation motor 70 starting the engine 10 or generating power according to an output of the engine 10; and a vehicle wheel 80.

Further, the hybrid electric vehicle may include a hybrid control unit (HCU) 110 controlling an overall operation of the hybrid electric vehicle; a battery control unit (BCU) 120 managing and controlling the battery 60; and a motor control unit (MCU) 200 controlling an operation of the motor 20. The battery controller 120 may refer to a battery management system (BMS).

The foregoing constituent elements of the hybrid electric vehicle are apparent to a person of an ordinary skill in the art, and thus a detailed description thereof is omitted.

The starting/power generation motor 70 may refer to an integrated starter and generator (ISG) or a hybrid starter and generator (HSG) in a field of the vehicle.

The hybrid electric vehicle as described above may run in a running mode including an electric vehicle (EV) mode or a pure electric vehicle mode using only power of the motor 20; a hybrid electric vehicle (HEV) mode using torque of the engine 10 as main power and torque of the motor 20 as auxiliary power; and a regenerative braking (RB) mode recovering brake and inertia energy through power generation of the motor 20 and charging the brake and inertia energy in the battery 60 during running due to brake or inertia of the vehicle.

As described above, the hybrid electric vehicle uses both mechanical energy of the engine and electrical energy of a battery, uses optimal operation regions of the engine and the motor, and recovers the energy of the motor during braking, thereby increasing fuel and energy efficiency.

However, in the hybrid electric vehicle as described above, the automatic transmission is coupled with the engine using the engine clutch instead of a torque converter so a mechanical (passive) damping effect of the torque converter may not be obtained.

In the electric vehicle, since a separate damping means is omitted or the damping means becomes small, during gear-shifting, engaging and disengaging of the accelerator pedal and engine clutch coupling. Furthermore, vibration such as shock and jerk (e.g., sudden rapid motion) as well as vibration of a driving shaft occur.

In other words, in an electric vehicle including the foregoing hybrid electric vehicle, since a damping means disposed between a torque source (e.g., an engine or a motor) and a driving system is omitted or the damping is small, vibration from the torque source or vibration from the exterior may not be attenuated. Accordingly, the electric vehicle may not provide a substantially smooth ride and drivability.

As an example of vibration suppress methods according to the related art, an anti-jerk control method recognizes a deviation (e.g., difference) between a model speed and an actual speed of the motor as vibration, and multiplies the deviation between the two speeds by a predetermined value to calculates a result, and feedbacks the result to suppress the vibration.

However, when extracting vibration component based on the deviation between the model speed and the actual speed of the motor, as shown in FIG. 2, an error may be included in the extracted vibration component. As described above, when the errors are included in the vibration component, even when there is no actual vibration, due to the erroneous determination of vibration, a vibration suppress torque may be applied, so that drivability and ride comfort may decrease.

The above information disclosed in this section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and a system for controlling anti-jerk of an electric vehicle having advantages of reducing an error component to be almost zero (0) by substantially removing an error component included in a vibration component when extracting the vibration component based on a model speed and a actual speed of an electric vehicle motor. An exemplary embodiment of the present invention provides a method and a system for controlling anti-jerk of an electric vehicle which compensate for phase error generated during high frequency filtering to minimize an influence of the phase error by high pass filtering the vibration component based on model speed and actual speed and delaying the high frequency filtered vibration component for a preset time.

In one embodiment of the present invention, the method includes: outputting an actual speed of the motor; outputting a model speed of the motor; obtaining a vibration component based on deviation between the output motor speed and actual speed of the motor; high pass filtering the vibration component to remove an error component included in the vibration component; delaying a phase of the filtered vibration component for a preset time to compensate for phase error occurring during the high pass filtering; and applying a preset gain to the vibration component in which the phase is delayed for the preset time to generate an anti-jerk compensation torque based on the applying of the preset gain.

The preset gain may be determined based on a running mode, gearshift information, and a running state of the electric vehicle.

The method may further include controlling a nonuse of the anti-jerk torque when the anti-jerk compensation torque is a preset value or less. Additionally, the method may further include limiting the anti-jerk compensation torque to a preset value when the anti-jerk compensation torque is an uppermost limit or greater to use the limited anti-jerk compensation torque. The method may further include determining whether the anti-jerk compensation torque is applied.

The high pass filtering of the vibration component may include removing an error component expressed by a function greater than a primary function based on Laplace transform. Additionally, the high pass filtering of the vibration component may include selecting a pass frequency of the vibration component using a bode plot.

The high pass filtering the vibration component may include high pass filtering the vibration component according to following Laplace transform equations. In the following equations, H(s) refers to a high pass filter. Design parameters in following filters include $a_i$ and k.

$$H(s) = \frac{a_k s^k}{\sum_{i=0}^{k} a_i s^i}$$

Further, it is assumed that u in following equations is composed of a vibration component and an error component to be extracted, and the error component is a polynomial function with respect to a time.

$$H(s)U(s) = \frac{a_k s^k}{\sum_{i=0}^{k} a_i s^i} \left( \frac{k_n}{s^n} + \frac{cs+d}{(s+\zeta\omega_n)^2 + \left(\sqrt{1-\zeta^2}\,\omega_n\right)^2} \right)$$

$$= k_n a_k \frac{s^{k-n}}{\sum_{i=0}^{k} a_i s^i} + \frac{cs+d}{(s+\zeta\omega_n)^2 + \left(\sqrt{1-\zeta^2}\,\omega_n\right)^2} \frac{a_k s^k}{\sum_{i=0}^{k} a_i s^i} \quad (k > n).$$

A first term inside a bracket in a first line of the equation is an error component of a polynomial function format with respect to the time to be removed, a second term inside the bracket in the first line of the equation is a vibration component to be extracted, a damping coefficient and a frequency of the vibration component is $\zeta$ and $\omega_n$, respectively. Specifically, s is Laplace transformation variable; k, n, c and d are constants determined by the motor velocity. Furthermore, when 1 is transformed by the Laplace transformation, 1 becomes 1/s. Additionally, $a_i$ is a design parameter of a filter designed according to the $\zeta$ and the $\omega_n$. In other words, the $a_i$ is determined according to a frequency of vibration to be passed. Further, another parameter k is determined according to a degree of the error component to be removed, in other words, a degree of the polynomial function. Since the degree of the polynomial function is 2 or less, k is may be 3, but the k may be greater than 3.

The delaying a phase, that is, a time of the filtered vibration component may include delaying the phase using the equation below. The reason to delay the phase or the time is because phase error may occur by high pass filtering. In the following equation, $\omega$ and f are angular speed and a frequency of the vibration, $\delta_T$ is time delay for compensating phase antecedence to be obtained through the following equation, and a final term of a first line indicates phase error in angular speed $\omega$ by H(s).

$$\angle\theta = \omega\delta_T = 2\pi f \delta_T = k\frac{\pi}{2} - \angle \sum_{i=0}^{k} a_i s^i \bigg|_{s=j\omega}$$

$$\Rightarrow \delta_T = \frac{k\frac{\pi}{2} - \angle \sum_{i=0}^{k} a_i s^i \big|_{s=j\omega}}{2\pi f}.$$

According to another embodiment of the present invention, a system for controlling anti-jerk of an electric vehicle using power of a motor, may include: a battery providing driving power to the motor; a battery control unit (BCU) managing and controlling charge and discharge states of the battery; and a motor controller (MCU) controlling driving of the motor, wherein the motor control executes a command for performing a method of controlling anti-jerk of an electric vehicle according to an exemplary embodiment of the present invention.

The motor controller may include a plurality of units, wherein the motor controller executes the plurality of units. The units may include: an actual speed output unit configured to output an actual speed of the motor; a model speed output unit configured to output a model speed of the motor; a vibration component output unit configured to output a vibration component based on a deviation between the model speed and the actual speed of the motor; a high pass filter high pass configured to filter the vibration component output from the vibration component output unit to remove an error component in the vibration component; a phase delay unit configured to delay a phase of the filtered vibration component for a preset time to compensate for phase error occurring when the vibration component is filtered by the high pass filter; and an anti-jerk compensation torque generator configured to apply a preset gain to the vibration component in which the phase is delayed for the preset time to generate an anti-jerk compensation torque based on the applying of the preset gain.

The preset gain may be obtained based on a running mode, gearshift information, and a running state of the electric vehicle.

The system may further include a dead band unit controlling a nonuse of the anti-jerk torque when the anti-jerk compensation torque is a preset value or less. Additionally, the system may include an anti-jerk compensation torque limiting unit configured to limit the anti-jerk compensation torque to a preset value when the anti-jerk compensation torque is an uppermost limit or greater to use the limited anti-jerk compensation torque. Furthermore, the system may include an anti-jerk compensation torque application determinator configured to determine when the anti-jerk compensation torque is applied.

As described above, an exemplary embodiment of the present invention may efficiently suppress vibration generated from the electric vehicle by removing error component included in the vibration component to control anti-jerk when extracting the vibration component based on model speed and actual speed of an electric vehicle motor.

Further, an exemplary embodiment of the present invention compensates for phase error generated during high frequency filtering to minimize an influence of the phase error generated by a high frequency filter so drivability and ride comfort may be improved by high pass filtering vibration component based on model speed and actual speed of an electric vehicle motor and delaying the high frequency filtered vibration component for a preset time.

DETAILED DESCRIPTION OF THE EMBODIMENTS

Figure 1:
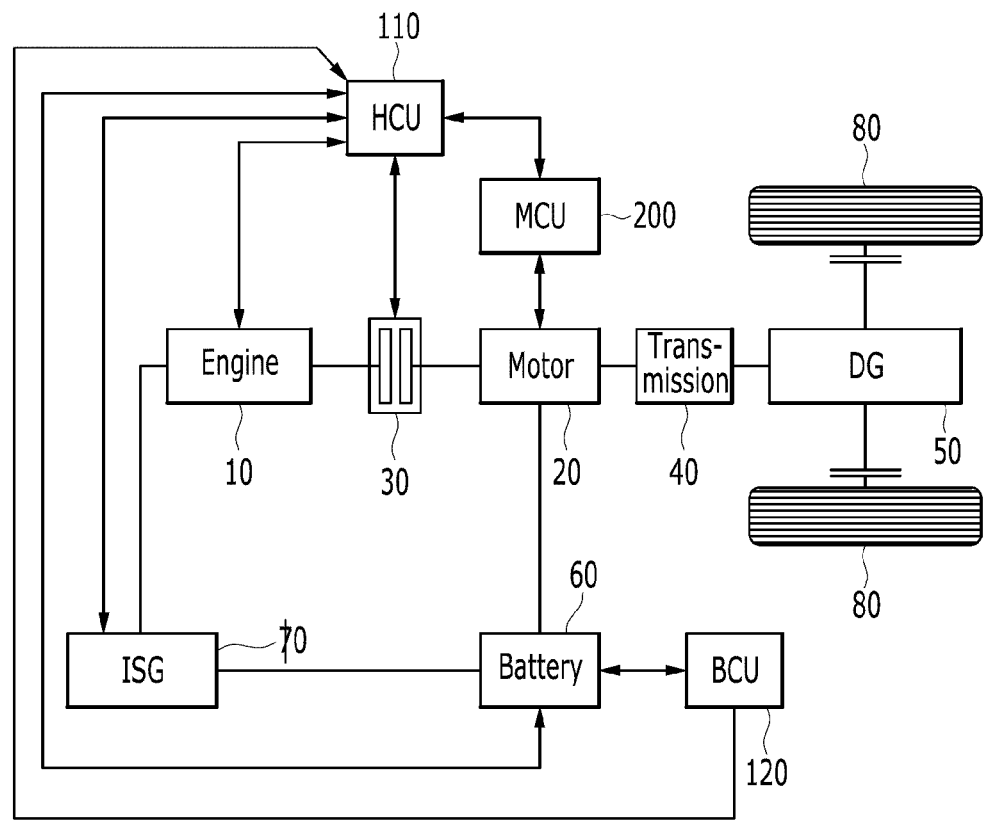
FIG. 1 is an exemplary diagram illustrating a hybrid electric vehicle according to the conventional art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules/units and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described more fully hereinafter with reference to the accompanying drawings, in which exemplary embodiments of the invention are shown. The present invention may be modified in various different ways, not limited to the exemplary embodiments described herein. In addition, a detailed description of various variables, signs, and constants of equations used in the specification apparent to a person having ordinary skill in the art is omitted for the purpose of simplifying the description.

FIG. 1 is an exemplary diagram illustrating a hybrid electric vehicle according to the conventional art.

As shown in FIG. 1, a hybrid electric vehicle to which a system for controlling anti-jerk according to an exemplary embodiment of the present invention may be applied, may include an engine 10; a motor 20; an engine clutch 30 configured to control power between the engine 10 and the motor 20; a transmission 40; a differential gear unit 50; a battery 60; a starting/power generation motor 70 starting the engine 10 or generating power according to an output of the engine 10; a vehicle wheel 80; a hybrid control unit (HCU) 110 configured to control an overall operation of the hybrid electric vehicle; a battery control unit (BCU) 120 configured to manage and control the battery 60; and a motor control unit (MCU) 200 configured to control an operation of the motor 20.

Figure 5:
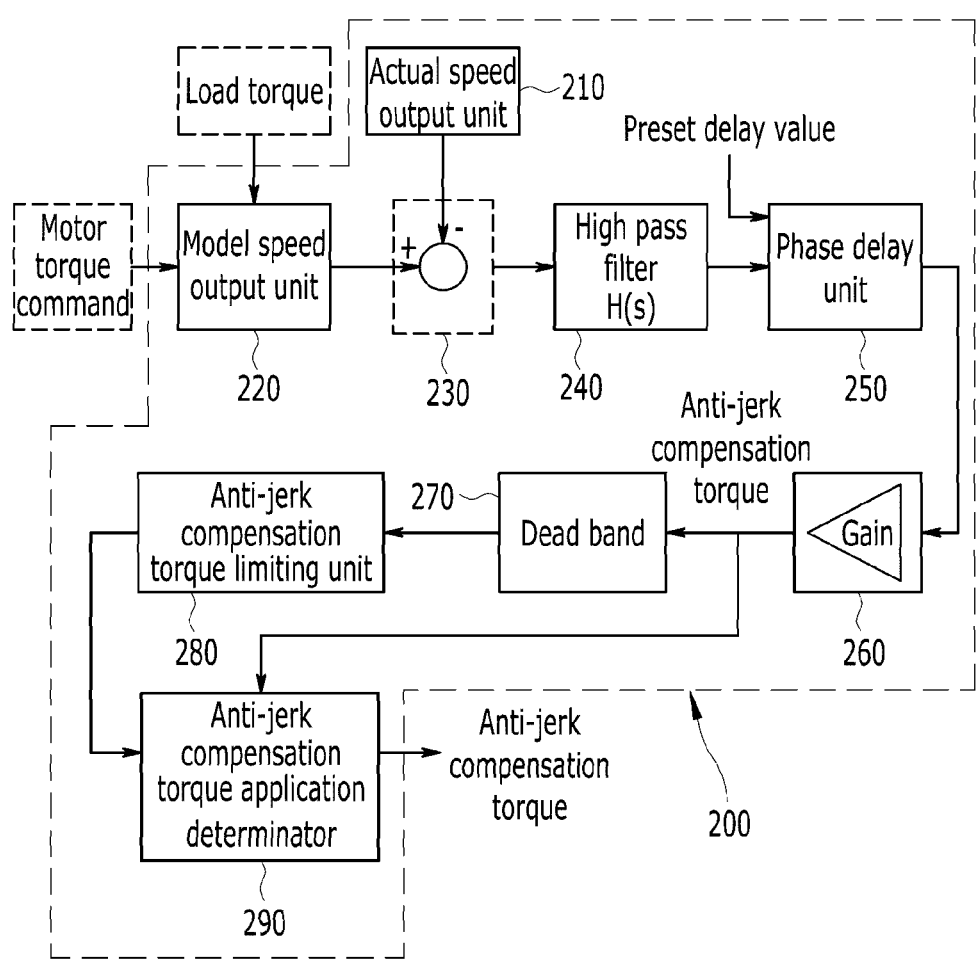
FIG. 5 is an exemplary block diagram illustrating a system for controlling anti-jerk of an electric vehicle according to an exemplary embodiment of the present invention.

FIG. 5 is an exemplary block diagram illustrating a system for controlling anti-jerk of an electric vehicle according to an exemplary embodiment of the present invention. The system of controlling anti-jerk shown in FIG. 5 may be included in the motor controller 200 of FIG. 1.

The system of controlling anti-jerk according to an exemplary embodiment of the present invention is an anti-jerk system configured to suppress vibration from a torque source such as the engine 10 and/or the motor 20 or exterior vibration.

The system of controlling anti-jerk according to an exemplary embodiment of the present invention may include a plurality of units controlled by the controller 200. The plurality of units may include an actual speed output unit 210 configured to output an actual speed of the motor 20; a model speed output unit 220 configured to output a model speed of the motor 20; a vibration component output unit 230 configured to output a vibration component based on a deviation between the model speed and the actual speed of the motor 20; a high pass filter 240 configured to high pass filter the vibration component output from the vibration component output unit 230 to remove an error component included in the vibration component; a phase delay unit 250 configured to delay the high pass filtered vibration component for a preset time to compensate for phase error generated when the vibration component is filtered by the high pass filter 240; and an anti-jerk compensation torque generator 260 configured to apply a preset gain to the vibration component in which a phase is delayed for the preset time to generate an anti-jerk compensation torque.

Additionally, the system of controlling anti-jerk according to an exemplary embodiment of the present invention may include a dead band unit 270 configured to control a nonuse of the anti-jerk compensation torque when the anti-jerk compensation torque is less than or equal to the lowermost limit; an anti-jerk compensation torque limiting unit 280 configured to limit the anti-jerk compensation torque to a predetermined value when the anti-jerk compensation torque is equal to or greater than to the uppermost limit; and an anti-jerk compensation torque application determinator 290 configured to determine when the anti-jerk compensation torque is applied.

Respective constituent elements of the system of controlling anti-jerk according to an exemplary embodiment of the present invention included in and executed by the motor controller 200 may be configured by a software program module which is executed by a processor or a microprocessor.

In other words, the motor controller 200 includes at least one processor or microprocessor operating by a predetermined program, and the predetermined program may be configured by a series of commands for executing the method of controlling anti-jerk according to an exemplary embodiment of the present invention to be described below.

The anti-jerk according to an exemplary embodiment of the present invention may be controlled by the motor controller 200. For example, the motor controller 200 may prevent the occurrence of vibration in a driving shaft when an accelerator pedal is engaged/disengaged during running in an EV mode, or slow running, at gear shift in an HEV mode, when the engine clutch is disengaged.

The actual speed output unit 210 of the motor controller 200 may output actual speed of the motor through known techniques. Additionally, the model output unit 210 of the motor controller 200 may output a model speed which is speed of the motor in a state that there is no vibration. Furthermore, the model speed output unit 210 may output model speed of the motor based on a motor torque command, a load torque, gearshift information, a running state, wheel speed, transmission input and output speed and vehicle mode.

The load torque may include a road slope and an air resistance drag; the running state includes engage/disengage of accelerator pedal, brake, gear-shift; and the vehicle mode may include an EV mode, an HEV mode, and an engine clutch slip.

Figure 2:
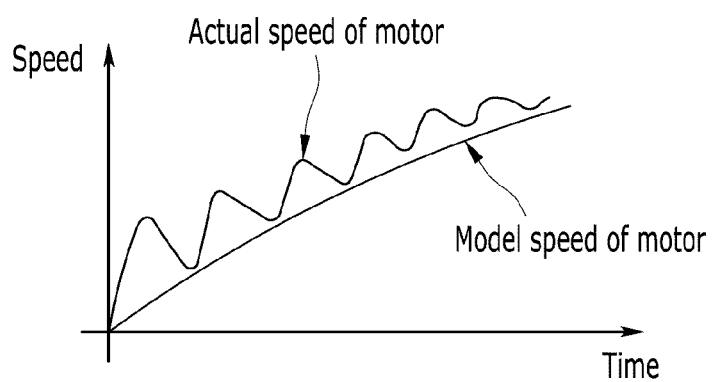
FIG. 2 is an exemplary graph illustrating an error component included in a vibration component according to the conventional art.
Figure 2:
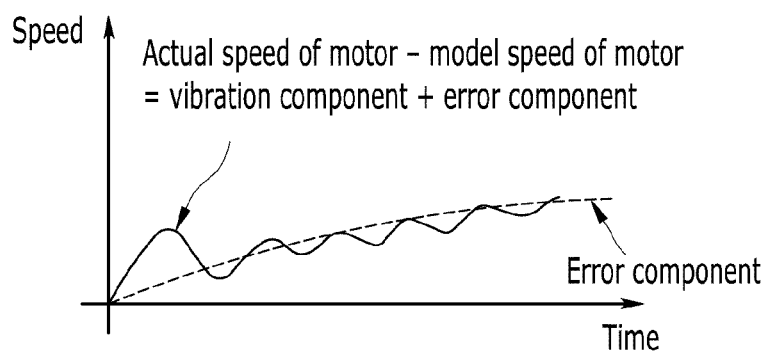

Furthermore, the model speed output unit 210 may subtract load torque including drag torque from a motor torque command value, subtract a total torque from the first result and integrate the second result to calculate the model speed of the motor. Specifically, the vibration component output unit 230 of the motor controller 200 may subtract actual speed of the motor output from the motor actual speed output unit 210 from the model speed of the motor output from the motor model speed output unit 220 to output a vibration component. The vibration component output from the vibration component output unit 230 may include an error component as shown in FIG. 2.

Figure 6:
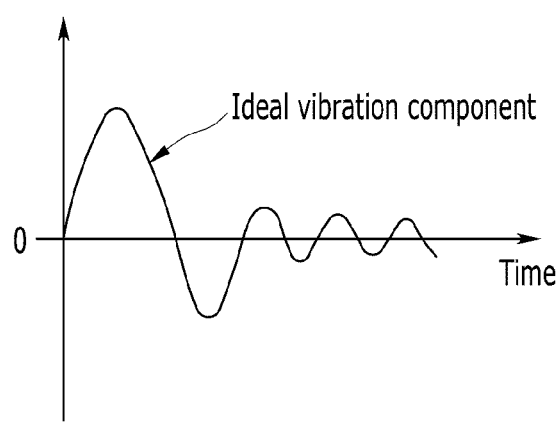
FIGS. 6 to 8 are exemplary graphs illustrating a control operation of anti-jerk of an electric vehicle according to an exemplary embodiment of the present invention.

The high pass filter 240 of the motor controller 200 may be configured to remove the error component included in the vibration component output from the vibration component output unit 230. The high pass filter 240 may output a filtered vibration component as shown in FIG. 6 by removing the error component included in the vibration component.

Moreover, the high pass filter 240 may remove the error component expressed by a function greater than the primary function based on Laplace transform. An example of a Laplace transform equation for removing error component expressed by a function greater than the primary function by the high pass filter 240 may be a following equation. In following equations, variables, signs and constants are used in a general Laplace transform equation and are apparent to a person of an ordinary skill in the art, and thus a detailed description thereof is omitted.

$$H(s) = \frac{a_k s^k}{\sum_{i=0}^{k} a_i s^i}$$

$$H(s)U(s) = \frac{a_k s^k}{\sum_{i=0}^{k} a_i s^i} \left( \frac{k_n}{s^n} + \frac{cs+d}{(s+\zeta\omega_n)^2 + \left(\sqrt{1-\zeta^2}\,\omega_n\right)^2} \right)$$

$$= k_n a_k \frac{s^{k-n}}{\sum_{i=0}^{k} a_i s^i} + \frac{cs+d}{(s+\zeta\omega_n)^2 + \left(\sqrt{1-\zeta^2}\,\omega_n\right)^2} \frac{a_k s^k}{\sum_{i=0}^{k} a_i s^i} \quad (k > n).$$

In the above Laplace transform equation, k is determined by an error component. In other words, the error component may be configured by constants and a function greater than the primary function. Accordingly, when the high pass filter 240 filters the error component based on the Laplace transform equation, the k may be set so the error component converges to zero (0). In other words, vibration component may as shown in FIG. 6, wherein the k is set so the error component converge to zero (0) when filtered through the high pass filter 240 according to an exemplary embodiment of the present invention using the Laplace transform equation.

Figure 7:
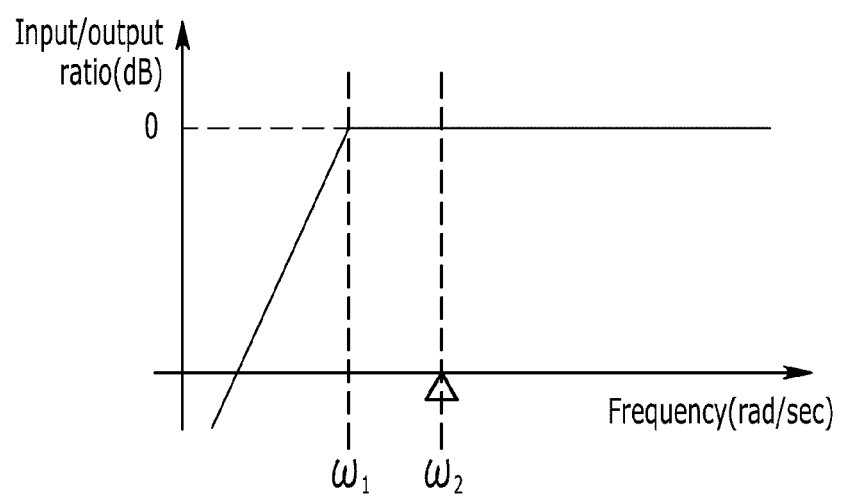

A pass frequency (e.g., cutoff frequency) of the high pass filter 240 may be selected using a bode plot as shown in FIG. 7. In FIG. 7, $\omega 1$ is the cutoff frequency, and $\omega 2$ is a frequency of a vibration component.

The frequency of the vibration component $\omega 2$ may be obtained as $\omega 2 = \sqrt{1-\zeta^2}\,\omega_x$. Further, a high pass filter (H(s)) 240 according to the frequency of the vibration component may be set as:

$$H(s) = H_\tau(s) = \frac{(\tau s)^k}{(1+\tau s)^k}$$

Figure 8:
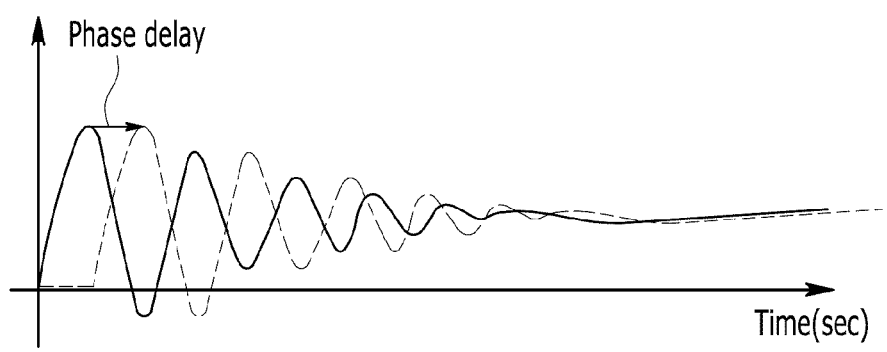

The phase delay unit 250 of the motor controller 200 may delay a phase of the vibration component passing through the high pass filter 240 as shown in FIG. 8. The phase of the vibration component is delayed due to a phase error of an ideal vibration component occurring on characteristics of the high pass filter 240 when only an ideal vibration component is output as the vibration component included in the error component passes through the high pass filter 240. The phase error by the high pass filter 240 may be depend on following equations.

$$\angle\theta = \angle \frac{a_k s^k}{\sum_{i=0}^{k} a_i s^i} \bigg|_{s=j\omega} = k\frac{\pi}{2} - \angle \sum_{i=0}^{k} a_i s^i \bigg|_{s=j\omega}$$

Accordingly, a phase delay angle $\angle\theta$ by the phase delay unit 250 may be obtained by the following equations.

$$\angle\theta = \omega\delta_T = 2\pi f \delta_T = k\frac{\pi}{2} - \angle \sum_{i=0}^{k} a_i s^i \bigg|_{s=j\omega}$$

$$\Rightarrow \delta_T = \frac{k\frac{\pi}{2} - \angle \sum_{i=0}^{k} a_i s^i \bigg|_{s=j\omega}}{2\pi f}.$$

When H(s) is designed as $H_\tau(s)$ in the foregoing equations, a delay angle or a delay time may be obtained as following equations.

$$\angle\theta = \omega\delta_T = 2\pi f \delta_T = k\left(\frac{\pi}{2} - \tan^{-1}(2\pi f \tau)\right) \Rightarrow \delta_T = \frac{k\left(\frac{\pi}{2} - \tan^{-1}(2\pi f \tau)\right)}{2\pi f}$$

The anti-jerk compensation torque generator 260 may apply a preset gain to the vibration component passing through the phase delay unit 250 to generate an anti-jerk compensation torque based thereon. The anti-jerk compensation torque generator 260 may refer to a running mode, gearshift information, and a running state of the electric vehicle to set the gain.

When the anti-jerk compensation torque is a preset lowest limit or less, the dead band unit 270 may be executed such that the anti-jerk compensation torque is not used. The dead band unit 270 may refer to the running mode, the gearshift information, and the running state of the electric vehicle to set the lowest limit.

When the anti-jerk compensation torque is a preset uppermost limit or greater, the anti-jerk compensation torque limiting unit 280 may limit the anti-jerk compensation torque to a preset value. The anti-jerk compensation torque limiting unit 280 may refer to the running mode, the gearshift information, and the running state of the electric vehicle to set the uppermost limit.

The anti-jerk compensation torque application determinator 290 may determine when the anti-jerk compensation torque output from the anti-jerk compensation generator 260 or the anti-jerk compensation limiting unit 280 is applied. The anti-jerk compensation torque application determinator 290 may refer to the running mode, the gearshift information, and the running state of the electric vehicle to determine an application prohibition situation of the anti-jerk compensation torque.

Hereinafter, the method of controlling anti-jerk of an electric vehicle according to an exemplary embodiment of the present invention will be described in detail with reference to the accompanying drawings.

Figure 3:
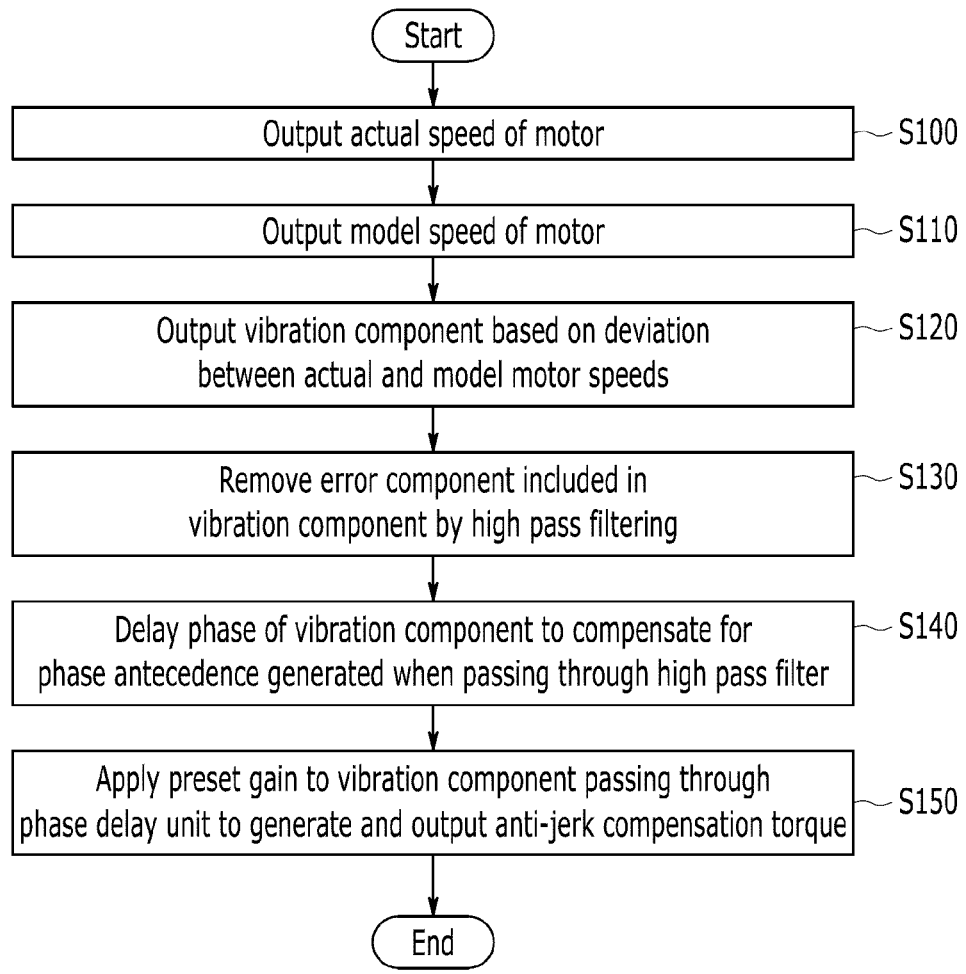
FIG. 3 is an exemplary flowchart illustrating a method of controlling anti-jerk of an electric vehicle according to an exemplary embodiment of the present invention.
Figure 4:
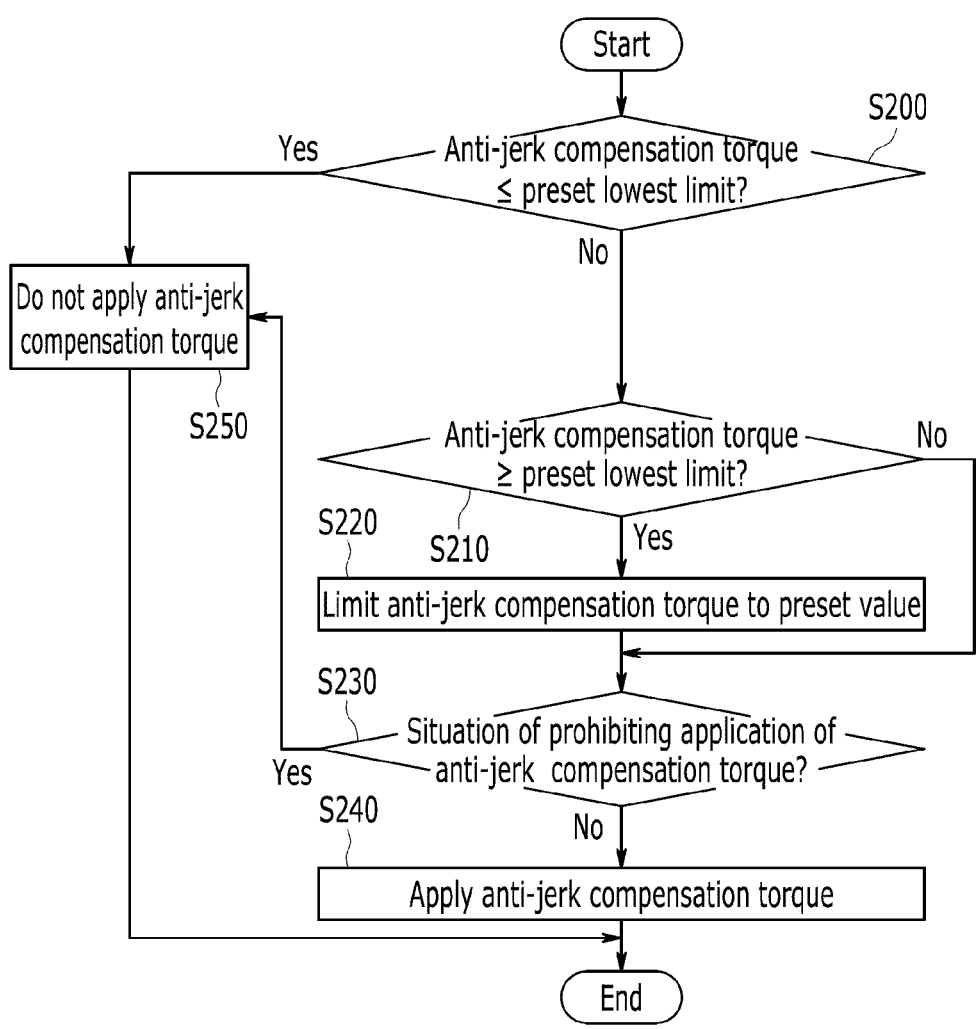
FIG. 4 is an exemplary flowchart illustrating a method of controlling anti-jerk of an electric vehicle according to an another exemplary embodiment of the present invention.

FIG. 3 is an exemplary flowchart illustrating a method of controlling anti-jerk of an electric vehicle according to an exemplary embodiment of the present invention.

As shown in FIG. 3, an actual motor speed output unit 210 and a motor model speed output unit 220 of the motor controller 200 may output an actual speed and a model speed of the motor (S100 and S110). An operation of referring to motor torque command and load torque is as illustrated above when the motor model speed output unit 220 outputs the model speed of the motor.

As described above, when the actual speed and the model speed of the motor are output, the vibration component output unit 230 of the motor controller 200 may output a vibration component based on deviation between the actual speed and the model speed of the motor (S120). For example, a deviation between the output actual speed and model speed of the motor may be a value obtained by subtracting the output actual speed of the motor from the output model speed of the motor, but it should be understood that the scope of the present invention is not limited thereto.

An error component as shown in FIG. 2 may be included in the vibration component output in step S120. Accordingly, as shown in FIG. 6, to extract a vibration component from which the error component is removed, the vibration component output at step S120 may by filtered by the high pass filter 240 of the motor controller 200 (S130).

When the vibration component output at step S120 passes through the high pass filter 240, an error component which is not removed when the vibration component passes through a low pass filter, may be removed. In other words, since the low pass filter uses a butterworth low pass filter, the error component may not be removed, as described below.

A construction of a low pass filter (L(s)) depends on following equations.

$$L(s) = \frac{\omega_n^2}{s^2 + 2\zeta\omega_n s + \omega_n^2} \Longrightarrow 1 - L(s) = \frac{s(s + 2\zeta\omega_n)}{s^2 + 2\zeta\omega_n s + \omega_n^2}$$

When the vibration component ($\Delta\omega$) passes through (1−L(s)) a low pass filter having the construction of the above equation, it may be understood from a following equation that an error exists in the vibration component when the vibration component $\Delta\omega$ has the primary degree, the secondary degree or greater with respect to the time.

$$(1 - L(s))\Delta\omega = \frac{s(s + 2\zeta\omega_n)}{s^2 + 2\zeta\omega_n s + \omega_n^2} \cdot \left(\frac{k_i}{s^i} + A\frac{as+b}{(s+\zeta\omega_n)^2 + \left(\sqrt{1-\zeta^2}\,\omega_n\right)^2}\right)$$

$$= \frac{k_i}{s^{i-1}} \frac{s + 2\zeta\omega_n}{s^2 + 2\zeta\omega_n s + \omega_n^2} +$$

$$A\frac{as+b}{(s+\zeta\omega_n)^2 + \left(\sqrt{1-\zeta^2}\,\omega_n\right)^2} \frac{s(s+2\zeta\omega_n)}{s^2 + 2\zeta\omega_n s + \omega_n^2}$$

Wherein, $$\frac{k_i}{s^i}$$

is an error component to be removed from the vibration component $\Delta\omega$, and $$A\frac{as+b}{(s+\zeta\omega_n)^2 + \left(\sqrt{1-\zeta^2}\,\omega_n\right)^2}$$

is a pure vibration component.

In other words, in the above equation, only when i=1, does $$\frac{k_i}{s^{i-1}} \frac{s + 2\zeta\omega_n}{s^2 + 2\zeta\omega_n s + \omega_n^2}$$

converge to zero (0) according to t→∞. When i>1, the $$\frac{k_i}{s^{i-1}} \frac{s + 2\zeta\omega_n}{s^2 + 2\zeta\omega_n s + \omega_n^2}$$

does not converge to 0 but the error component occurs. This result may be calculated by calculating an inverse Laplace transform, which is apparent to a person of an ordinary skill in the art, and thus a detailed description thereof is omitted. Accordingly, when a component greater than the primary degree is input to the low pass filter, the error component may be included in the vibration component.

Moreover, when using a high pass filter H(s) 240 having a construction of a following equation according to an exemplary embodiment of the present invention, error component of the primary degree, the secondary degree, and greater in the vibration component $\Delta\omega$ may be removed.

$$H(s) = \frac{a_k s^k}{\sum_{i=0}^{k} a_i s^i}$$

-continued $$H(s)\Delta\omega = \frac{k_n}{s^n} \frac{a_k s^k}{\sum_{i=0}^{k} a_i s^i} + A \frac{as+b}{(s+\zeta\omega_n)^2 + (\sqrt{1-\zeta^2}\,\omega_n)^2} \frac{a_k s^k}{\sum_{i=0}^{k} a_i s^i}$$

$$= k_n a_k \frac{s^{k-n}}{\sum_{i=0}^{k} a_i s^i} + A \frac{as+b}{(s+\zeta\omega_n)^2 + (\sqrt{1-\zeta^2}\,\omega_n)^2} \frac{a_k s^k}{\sum_{i=0}^{k} a_i s^i} \quad (k \geq n)$$

Wherein, $a_i$ may be selected so the real parts of a root $$\sum_{i=0}^{k} a_i s^i = 0$$

of a denominator become a negative number.

Further, when setting k to satisfy k≥n in the above equation, $$k_n a_k \frac{s^{k-n}}{\sum_{i=0}^{k} a_i s^i}$$

may converge to 0 according to t→∞ and only the vibration component may remain in the calculated result because $a_i$ may be selected using a bode plot scheme to cutoff a corresponding frequency of a corresponding vibration component during design of the high pass filter H(s).

In an exemplary embodiment of the present invention, a high pass filter H(s) may be designed to be operated using the bode plot as follows.

In the bode plot shown in FIG. 7, ω1 is a corner frequency, which is a cutoff frequency of the high pass filter, and ω2 is vibration frequency ($=\sqrt{1\zeta^1\omega_n}$) of the vibration component. The high pass filter H(s) may be designed to satisfy ω2≫ω1 in the bode plot. Since the bode plot shown in FIG. 7 is ideal, γ may be set to satisfy ω2>γω1γ>1 in an actual design.

To easily design the high pass filter H(s), the high pass filter H(s) may be set as illustrated in following equations.

$$H(s) = H_\tau(s) = \frac{(\tau s)^k}{(1+\tau s)^k}$$

When the error component is removed from the high pass filter 240 so only a vibration component is output, the phase delay unit 250 may delay a phase of the vibration component according to a preset delay value to compensate for phase error generated when passing through the high pass filter 240 (S140).

The phase error by the high pass filter 240 may be depend on following equations.

$$\angle\theta = \angle \frac{a_k s^k}{\sum_{i=0}^{k} a_i s^i}\bigg|_{s=j\omega} = k\frac{\pi}{2} - \angle\sum_{i=0}^{k} a_i s^i \bigg|_{s=j\omega}$$

Accordingly, a phase delay angle ∠θ through the phase delay unit 250 may be obtained by following equations.

$$\angle\theta = \omega_2 \delta_T = 2\pi f_2 \delta_T = k\frac{\pi}{2} - \angle\sum_{i=0}^{k} a_i s^i \bigg|_{s=j\omega} \Rightarrow \delta_T = \frac{k\frac{\pi}{2} - \angle\sum_{i=0}^{k} a_i s^i \bigg|_{s=j\omega}}{2\pi f_2}.$$

When the H(s) is designed as the $H_\tau(s)$, the phase delay angle is as follows.

$$\angle\theta = \angle \frac{(\tau s)^k}{(1+\tau s)^k}\bigg|_{s=j\omega} = k\left(\frac{\pi}{2} - \tan^{-1}(\omega\tau)\right) = k\left(\frac{\pi}{2} - \tan^{-1}(2\pi f\tau)\right)$$

$$\angle\theta = \omega\delta_T = 2\pi f \delta_T = k\left(\frac{\pi}{2} - \tan^{-1}(2\pi f\tau)\right) \Rightarrow \delta_T = \frac{k\left(\frac{\pi}{2} - \tan^{-1}(2\pi f\tau)\right)}{2\pi f}$$

When the vibration component passing through the phase delay unit 250 is input to the anti-jerk compensation torque generator 260, the anti-jerk compensation torque generator 260 may apply a preset gain to the vibration component passing through the phase delay unit 250 to generate and output the anti-jerk compensation torque (S150). The anti-jerk compensation torque generated from the anti-jerk compensation torque generator 260 may be used as an anti-jerk torque.

Additionally, the anti-jerk compensation torque generated by the anti-jerk compensation torque generator 260 may be inputted to the dead band unit 270. The dead band unit 270 may determine whether the input anti-jerk compensation torque is a preset lower limit or less (S200). When the input anti-jerk compensation torque is a preset lower limit or less, the dead band unit 270 may control a nonuse of the anti-jerk compensation torque (S250). For example, the preset lower limit may be a value when application of the anti-jerk compensation torque does not influence ride comfort and drivability.

When anti-jerk compensation torque input to the dead band unit 270 exceeds the preset lowest limit, the anti-jerk compensation torque limiting unit 280 may determine when the anti-jerk compensation torque is the uppermost limit or greater (S210). When the anti-jerk compensation torque is the uppermost limit or greater, the anti-jerk compensation torque limiting unit 280 may limit the anti-jerk compensation torque to a preset value (S220). For example, the uppermost limit may be determined as a value when the anti-jerk compensation torque adversely affects the drivability and ride comfort.

When the anti-jerk compensation torque is less than the preset uppermost limit, the motor controller 200 may determine when a current situation of the vehicle is a situation of prohibiting application of the anti-jerk compensation torque through the anti-jerk compensation torque application determinator 290 (S230). When the current situation of the vehicle is not the situation of prohibiting application of the anti-jerk compensation torque, the motor controller 200 may apply the anti-jerk compensation torque to reduce the vibration of the vehicle so the drivability and ride comfort of the vehicle may be improved (S240). When the current situation of the vehicle is not the situation of prohibiting application of the anti-jerk compensation torque, the motor controller 200 may reverse the application of the anti-jerk compensation torque.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. A method of controlling anti-jerk of a vehicle using power of a motor, the method comprising:
   outputting, by a controller, an actual speed of the motor;
   outputting, by the controller, a model speed of the motor;
   outputting, by the controller, a vibration component based on a deviation between the output motor speed and actual speed of the motor;
   high pass filtering, by the controller, the vibration component to remove an error component in the vibration component;
   delaying, by the controller, a phase of the filtered vibration component for a preset time to compensate for phase error occurring during the high pass filtering; and
   applying, by the controller, a preset gain to the filtered vibration component in which the phase is delayed for the preset time to generate an anti-jerk compensation torque,
   wherein the high pass filtering of the vibration component comprises removing, by the controller, an error component expressed by a function greater than a primary function, and high pass filtering the vibration component according to a following Laplace transform equation:

$$H(s) = \frac{a_k s^k}{\sum_{i=0}^{k} a_i s^i}$$

$$H(s)U(s) = \frac{a_k s^k}{\sum_{i=0}^{k} a_i s^i} \left( \frac{k_n}{s_n} + \frac{cs+d}{(s+\zeta\omega_n)^2 + \left(\sqrt{1-\zeta^2}\,\omega_n\right)^2} \right)$$

$$= k_n a_k \frac{s^{k-n}}{\sum_{i=0}^{k} a_i s^i} + \frac{cs+d}{(s+\zeta\omega_n)^2 + \left(\sqrt{1-\zeta^2}\,\omega_n\right)^2} \frac{a_k s^k}{\sum_{i=0}^{k} a_i s^i} \quad (k > n)$$

wherein, $H(s)$ is the high pass filter; $a_i$, $k$ are design parameters; $\zeta$ is a damping coefficient; $\omega_n$ is a vibration component.

2. The method of claim 1, wherein the preset gain is obtained based on a running mode, gearshift information, and a running state of the electric vehicle.

3. The method of claim 2, further comprising controlling, by the controller, a nonuse of the anti-jerk torque when the anti-jerk compensation torque is a preset value or less.

4. The method of claim 2, further comprising limiting, by the controller, the anti-jerk compensation torque to a preset value when the anti-jerk compensation torque is an uppermost limit or greater to use the limited anti-jerk compensation torque.

5. The method of claim 1, further comprising determining, by the controller, when the anti-jerk compensation torque is applied.

6. The method of claim 1, wherein the high pass filtering of the vibration component comprises selecting, by the controller, a cutoff frequency of the vibration component using a bode plot.

7. The method of claim 1, wherein the delaying of the phase of the filtered vibration component for the preset time comprises calculating, by the controller, a phase delay angle $\angle\theta$ using a following equation:

$$\angle\theta = \omega_2 \delta_T = 2\pi f_2 \delta_T = k\frac{\pi}{2} - \angle\sum_{i=0}^{k} a_i s^i \bigg|_{s=j\omega} \Rightarrow \delta_T = \frac{k\frac{\pi}{2} - \angle\sum_{i=0}^{k} a_i s^i \big|_{s=j\omega}}{2\pi f_2},$$

$$\angle\theta = \angle\frac{(\tau s)^k}{(1+\tau s)^k}\bigg|_{s=j\omega} = k\left(\frac{\pi}{2} - \tan^{-1}(\omega\tau)\right) = k\left(\frac{\pi}{2} - \tan^{-1}(2\pi f\tau)\right)$$

$$\angle\theta = \omega\delta_T = 2\pi f\delta_T = k\left(\frac{\pi}{2} - \tan^{-1}(2\pi f\tau)\right) \Rightarrow \delta_T = \frac{k\left(\frac{\pi}{2} - \tan^{-1}(2\pi f\tau)\right)}{2\pi f}$$

wherein, $a_i$, $k$ are design parameters; $\omega$, $f$ are an angular speed and a frequency of vibration to be extracted; $\delta_T$ is a time delay to compensate for phase error.

8. A system for controlling anti-jerk of an electric vehicle using power of a motor, the system comprising:
   a battery configured to provide a driving power to the motor;
   a battery control unit (BCU) configured to manage and control a charge and a discharge state of the battery; and
   a motor controller (MCU) controlling driving of the motor, wherein the motor control is configured to:
   output an actual speed of the motor;
   output a model speed of the motor;
   output a vibration component based on a deviation between the output motor speed and actual speed of the motor;
   high pass filter the vibration component to remove an error component in the vibration component;
   delay a phase of the filtered vibration component for a preset time to compensate for phase error occurring during the high pass filtering; and
   apply a preset gain to the filtered vibration component in which the phase is delayed for the preset time to generate an anti-jerk compensation torque,
   wherein the high pass filter of the vibration component comprises removing an error component expressed by a function greater than a primary function, and high pass filtering the vibration component according to a following Laplace transform equation:

$$H(s) = \frac{a_k s^k}{\sum_{i=0}^{k} a_i s^i}$$

$$H(s)U(s) = \frac{a_k s^k}{\sum_{i=0}^{k} a_i s^i} \left( \frac{k_n}{s_n} + \frac{cs+d}{(s+\zeta\omega_n)^2 + \left(\sqrt{1-\zeta^2}\,\omega_n\right)^2} \right)$$

$$= k_n a_k \frac{s^{k-n}}{\sum_{i=0}^{k} a_i s^i} + \frac{cs+d}{(s+\zeta\omega_n)^2 + \left(\sqrt{1-\zeta^2}\,\omega_n\right)^2} \frac{a_k s^k}{\sum_{i=0}^{k} a_i s^i} \quad (k > n)$$

wherein, $H(s)$ is the high pass filter; $a_i$, $k$ are design parameters; $\zeta$ is a damping coefficient; $\omega_n$ is a vibration component.

9. The system of claim 8, wherein the motor controller is further configured to:
   apply a gain obtained based on a running mode, gearshift information, and a running state of the electric vehicle to the vibration component in which the phase is delayed for the preset time.

10. The system of claim 8, wherein the motor controller is further configured to:

control a nonuse of the anti-jerk torque when the anti-jerk compensation torque is a preset value or less.

11. The system of claim 8, wherein the motor controller is further configured to:
limit the anti-jerk compensation torque to a preset value when the anti-jerk compensation torque is an uppermost limit or greater to use the limited anti-jerk compensation torque.

12. The system of claim 8, wherein the motor controller is further configured to:
determine when the anti-jerk compensation torque is applied.

13. A non-transitory computer readable medium containing program instructions executed by a processor or controller, the computer readable medium comprising:
program instructions that control a battery to provide driving power to a motor;
program instructions that manage and control a charge and a discharge state of the battery;
program instructions that output an actual speed of the motor;
program instructions that output a model speed of the motor;
program instructions that output a vibration component based on a deviation between the output motor speed and actual speed of the motor;
program instructions that high pass filter the vibration component to remove an error component in the vibration component;
program instructions that delay a phase of the filtered vibration component for a preset time to compensate for phase error occurring during the high pass filtering; and
program instructions that apply a preset gain to the filtered vibration component in which the phase is delayed,
wherein the high pass filter of the vibration component comprises removing an error component expressed by a function greater than a primary function, and high pass filtering the vibration component according to a following Laplace transform equation:

$$H(s) = \frac{a_k s^k}{\sum_{i=0}^{k} a_i s^i}$$

$$H(s)U(s) = \frac{a_k s^k}{\sum_{i=0}^{k} a_i s^i} \left( \frac{k_n}{s_n} + \frac{cs+d}{(s+\zeta\omega_n)^2 + \left(\sqrt{1-\zeta^2}\,\omega_n\right)^2} \right)$$

$$= k_n a_k \frac{s^{k-n}}{\sum_{i=0}^{k} a_i s^i} + \frac{cs+d}{(s+\zeta\omega_n)^2 + \left(\sqrt{1-\zeta^2}\,\omega_n\right)^2} \frac{a_k s^k}{\sum_{i=0}^{k} a_i s^i} \quad (k>n)$$

wherein, $H(s)$ is the high pass filter; $a_i$, $k$ are design parameters; $\zeta$ is a damping coefficient; $\omega_n$ is a vibration component.

14. The computer readable medium of claim 13, further comprising:
program instructions that apply a gain obtained based on a running mode, gearshift information, and a running state of the electric vehicle to the vibration component in which the phase is delayed for the preset time.

15. The computer readable medium of claim 13, further comprising:
program instructions that control a nonuse of the anti-jerk torque when the anti-jerk compensation torque is a preset value or less.

16. The computer readable medium of claim 13, further comprising:
program instructions that limit the anti-jerk compensation torque to a preset value when the anti-jerk compensation torque is an uppermost limit or greater to use the limited anti-jerk compensation torque.

17. The computer readable medium of claim 13, further comprising:
program instructions that determine when the anti-jerk compensation torque is applied.

* * * * *